United States Patent [19]

Fleischer et al.

[11] 3,725,918
[45] Apr. 3, 1973

[54] COLLISION AVOIDANCE DISPLAY APPARATUS FOR MANEUVERABLE CRAFT

[75] Inventors: Herman J. Fleischer, Halesite; Philip Lipsky, Hartsdale; Bert V. Tiblin, Huntington, all of N.Y.

[73] Assignee: Sperry Rand Corporation, New York, N.Y.

[22] Filed: Nov. 18, 1970

[21] Appl. No.: 90,558

[52] U.S. Cl. ............................343/5 EM, 343/112 CA
[51] Int. Cl. ..................................................G01s 7/06
[58] Field of Search ......................343/5 EM, 112 CA

[56] References Cited

UNITED STATES PATENTS

3,188,631   6/1965   Birtley..............................343/5 EM

*Primary Examiner*—Benjamin A. Borchelt
*Assistant Examiner*—G. E. Montone
*Attorney*—S. C. Yeaton

[57] ABSTRACT

Collision avoidance display apparatus that provides indicia representative of present positions of intruding vehicles as well as predicted tracks thereof. Each track terminates in a region representative of the area to be avoided to assure passing the corresponding intruding vehicle by at least a predetermined distance. These displayed indicia provide information for assessing maneuvers to avoid collision with the intruding craft.

11 Claims, 6 Drawing Figures

COLLISION AVOIDANCE DISPLAY APPARATUS FOR MANEUVERABLE CRAFT

BACKGROUND OF THE INVENTION

1. Field of the Invention

The present invention pertains to collision avoidance display apparatus for providing indicia for the assessment of possible maneuvers of a craft to avoid collision with intruding vehicles. The invention is particularly suitable for marine vessels.

2. Description of the Prior Art

Radio and other aids to marine navigation have been utilized in the past for augmenting the look-out s ability visually to determine potential collisions between marine vessels. Radar systems and similar sensors have been used to determine the bearing rates and range rates corresponding to intruding vessels. However, the detection of small bearing rates at large ranges does not lend itself to accurate instrumentation since small errors by the successive bearing readings destroy the accuracy of prediction of the closest point of approach of the intruding vessel.

Other prior art collision warning techniques have utilized the measurement of passing distance at the closest point of approach. In such systems, radar indicators, reflection plotters and plotting tables are often used. However, errors of plotting can seriously degrade the reliability of these methods. Generally, an operator cannot accurately plot the data and assess from it the degree of danger associated with more than three intruding targets simultaneously. Semi-automatic transfer of radar data to plotting boards has been attempted, but the instrumentation is expensive. Also proposed have been quite expensive, though more accurate, photographic plotting systems. In these photographic systems, few errors can be introduced by the operator.

In addition to the above disadvantages, collision avoidance systems that utilize the closest point of approach parameter suffer from a further disadvantage. When own ship changes heading, the time of closest point of approach changes radically and in a manner difficult to visualize. Knowing only the coordinates of the presently predicted closes, point of approach does not clearly inform the ship's pilot as to heading or headings that must be avoided. The character of displays emphasizing the closest point of approach criterion is indeed such that it is possible to predict closest point of approach data corresponding to only the threat along present ship's heading without any indication of dangers along a new course such s one to avoid a present danger. Displays of CPA's for trial headings and speeds have been incorporated on some devices in the past, but this approach is time consuming, incomplete, and requires the operator to remember the result of previous trials.

Typical collision warning systems of the above-described type do not in a fully accurate or rapid manner furnish data directly usable in reliably assessing what maneuver own ship must make in order effectively to avoid an impending collision. The ship's operator must, upon observation of a collision potential, apply various rules and customs such as the International Rules of the Road and the Inland Rules of the Road which have been devised to prevent collisions. The Steering and Sailing Rules must also be followed when there is risk of collision. It is left to the ship's operator after the warning of an impending collision to exercise a difficult judgement as to what maneuver he must order the ship to make so as to remove the risk of collision. The required space for a safe maneuver depends upon knowledge of many factors, such as knowledge of the intruding vessel's class, speed, intention, and heading. Adverse wind and sea states can be influential in causing erroneous maneuvers leading to disaster rather than to evasion.

A collision avoidance system that endeavors to obviate the disadvantages discussed above utilizes the predicted point of collision parameter. Such a system is described in copending U.S. Pat. application Ser. No. 87,025, entitled "Ship's Maneuver Assessment System" by Robert F. Riggs, filed On Nov. 5, 1970, and assigned to the assignee of the present invention. As described in said Ser. No. 87,025, collision avoidance apparatus is provided that displays the possible points of collision of own ship with respect to intruding vessels. As further explained in said Ser. No. 87,025, if it is desirable to miss the intrudinG vessels by a minimum predetermined distance, a circle of radius equal thereto may be displayed centered about each possible point of collision. The ship's operator would then steer his vessel to avoid having own course intersect any of these circles. It was discovered, however, that own ship when maneuvered to avoid the circles, under normally occurring dynamic situations, could pass closer to intruding vessels than the predetermined distance. The actual passing distance achieved utilizing this prior display may be small enough to precipitate a collision situation.

SUMMARY OF THE INVENTION

The present invention utilizes a computer generated display of intruding vessels with predicted tracks associated therewith. Located at the future end of each track is a predicted area of danger which if avoided by own ship assures that a predetermined minimum passing distance is actually achieved. The predicted area of danger is generally elliptically shaped with the major axis of the ellipse aligned with the predicted track.

DESCRIPTION OF THE PREFERRED EMBODIMENT

Figure 1:
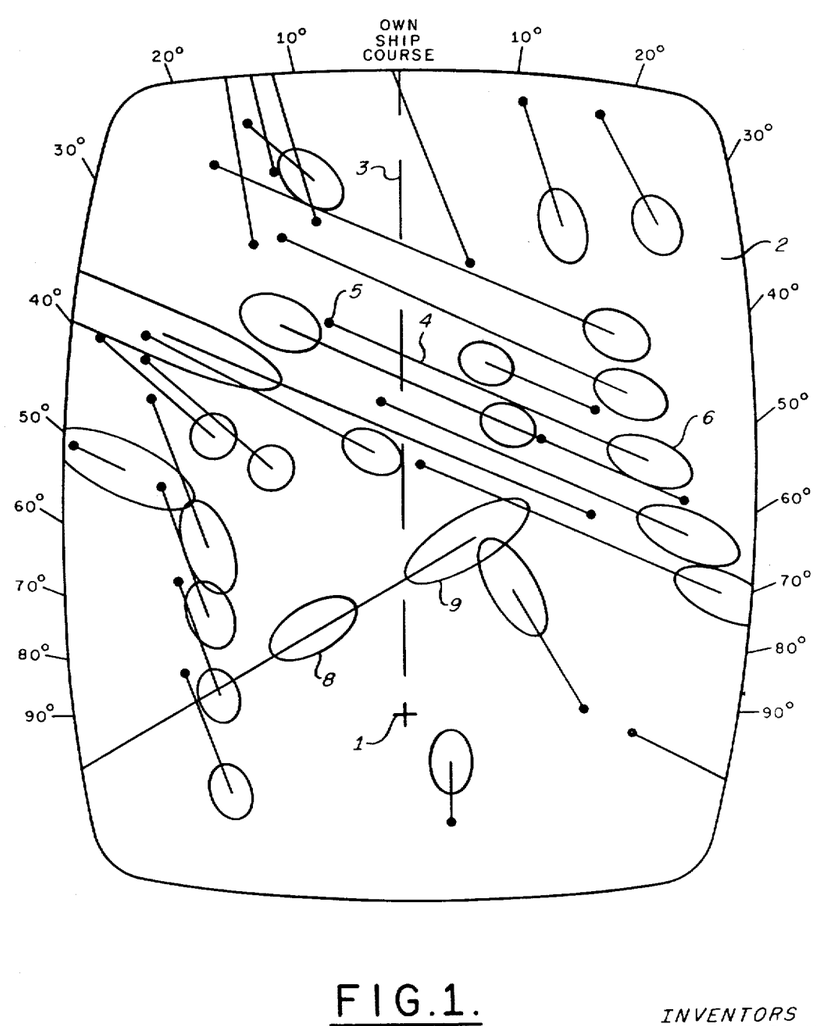
FIG. 1 is a plan view of the screen of a cathode ray tube showing symbols used in the display of the present invention.

The collision avoidance and collision assessment apparatus of the present invention provides a synthetic display normally generated by a cathode ray tube indicator and designed to present to the viewer all information needed for performing an effective maneuver whenever risk of collision with an intruding ship is established. The display, as indicated in FIG. 1, is by way of example an X–Y display, representing the position of own ship at the location 1 at the bottom of the indicator screen 2. A heading flash cursor 3 is normally directed vertically or across screen 2 in the presentation, being formed by conventional heading flasher means so as to extend from location 1 substantially to the opposite side of screen 2. The heading cursor 3 thus represents the future track of own ship unless own ship's course is to be disturbed.

Other indications formed of straight lines and ellipses appear on the screen 2 of FIG. 1. Each represents characteristics of ships in the locality of own ship; for example, the end 5 of line 4 represents the present position of a target ship 5 which might be regarded as an intruder. The straight line 4 indicates the intruding target's future track. The ellipse 6 formed at the end of future track 4 represents a region of predicted danger that own ship 1 must avoid to be assured of passing intruder ship 5 by at least a predetermined distance in a manner to be explained. It is seen that the intruding vessel's heading is represented by the direction of the target's future track line 4. When the intruder is faster than own ship there may be two danger zones such as represented by ellipses 8 and 9 of the overtaking ship of FIG. 1.

It will be clear to those skilled in the cathode ray display art that any of several well known approaches may be used in tracing symbols on the face 2 of the cathode ray tube. Type P scansion or raster scansion of the electron beam may be employed within the scope of the invention, each symbol being drawn by intensification of the electron beam as it is deflected across the locus of the symbol. It is furthermore apparent to one skilled in the art that symbols may be drawn by well known means during the fly-back or re-trace time between each such electron beam deflection, for example by one or by a series of deflections of the intensified beam during the fly-back time in a raster scanning system. Such methods are well known in the art, as also are methods in which the regular polar or raster scanning of the intensified electron beam is not used. In such apparatus, symbols are generated by forming a programmed series of deflection strokes to form a symbol. The display illustrated in FIG. 1 shows how ships will appear when approaching at various angles and speeds.

The concepts and the principles to be utilized in generating the display of FIG. 1 will be understood by reference to FIG. 2 wherein geometrical representations useful in explaining the theory of operation of the invention are illustrated. Referring to FIG. 2a, the points $D_1$, $D_2$, $D_3$ and $D_4$ along the target velocity vector are calculated which would provide the selected predetermined miss distance if own ship were to head for these points at present speed. These points then define the boundaries of predicted regions of danger associated with the target as shown by the cross-hatched areas. For a target faster than own ship, two regions of danger will generally be present. The dimension of the danger region perpendicular to the target vector becomes important only if own ship attempts to cruise parallel to the target. Accordingly, the dimension of the danger region on either side of the target vector is set to the selected miss distance. A convenient contour for the region of danger is that of an ellipse. The minor diameter of the ellipse is accordingly chosen at twice the selected miss distance, the major diameter for the one ellipse being $D_T$-$D_1$ and the major diameter for the other being $D_4$-$D_3$. Therefore in order to define a danger area, the quantities $D_1$, $D_2$, $D_3$ and $D_4$ must be determined. For an intruder slower than own ship, only one danger zone exists, and therefore for the slower intruder only $D_1$ and $D_2$ must be determined. The following is a development of the equations so required.

Figure 2A:
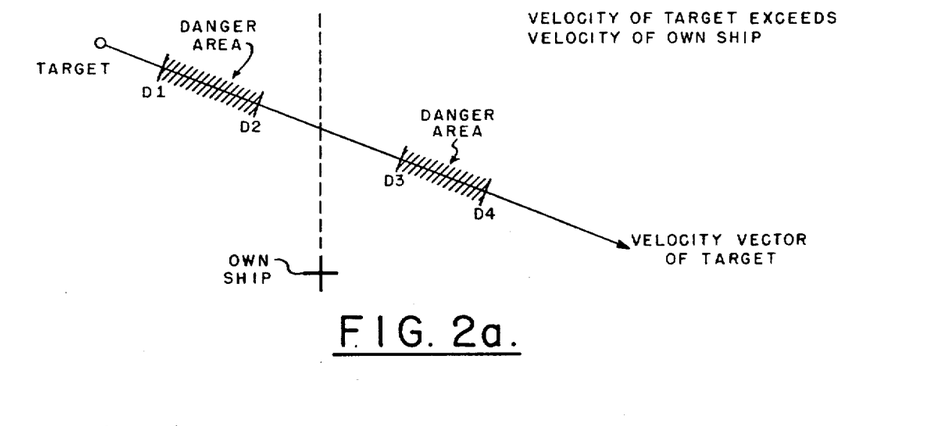
FIGS. 2A–D are geometrical representations useful in explaining the theory of operation of the invention.
Figure 2B:
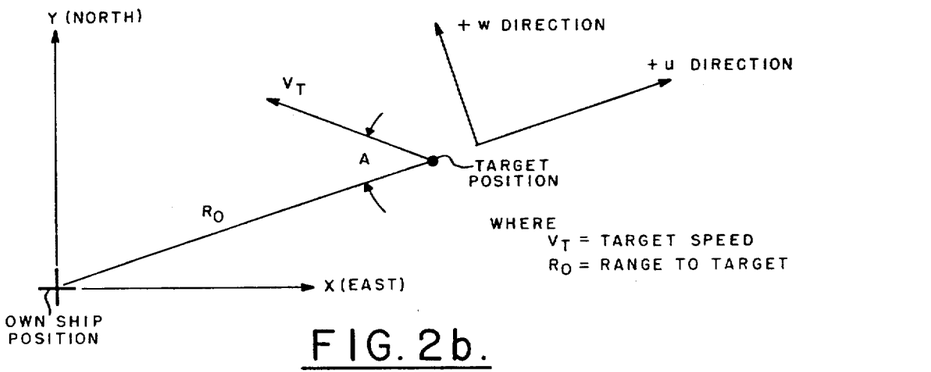

Since miss distance is conveniently defined in relative space and the danger area defined in true space, an axis system which is common to both is chosen. FIG. 2b illustrates the axis system used in the development of the equations where the U-axis is parallel to the direction between own ship and the intruding vessel under computation and the W-axis is perpendicular to the U-axis.

The target data is tracked and smoothed with respect to a coordinate reference frame with the Y-axis in the north direction and the X-axis in the east direction. $X_T$ and $Y_T$ are target positions relative to own ship and $\dot{X}_T$ and $\dot{Y}_T$ are the east and north velocities of the target relative to the earth.

Figure 2C:
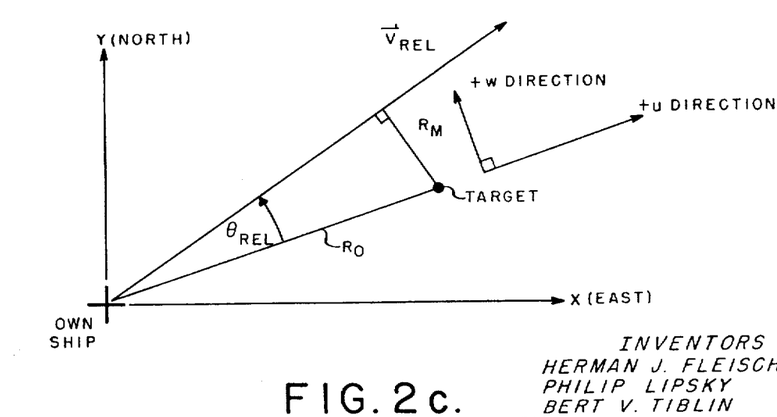

Referring to FIGS. 2b and c, relative velocity $\bar{V}_{REL}$ is defined as:

$$\bar{V}_{REL} = \bar{V}_S - \bar{V}_T \quad (1)$$

where the V's represent velocity vectors and where $\bar{V}_S$ is own ship velocity and $\bar{V}_T$ is target velocity. In vector notation $$\bar{V}_S = \dot{U}_S \bar{u} + \dot{W}_S \bar{w}$$

$$\bar{V}_T = \dot{U}_T \bar{u} + \dot{W}_T \bar{w}$$

where $\bar{u}$ and $\bar{w}$ are unit vectors in the $U$ and $W$ directions, respectively, and $\dot{U}_S$, $\dot{W}_S$ and $\dot{U}_T$, $\dot{W}_T$ are own ship's and target ship's speed components, respectively. Thus, $$\bar{V}_{REL} = (\dot{U}_S - \dot{U}_T)\bar{u} + (\dot{W}_S - \dot{W}_T)\bar{w} \quad (2)$$

The predetermined miss distance, $R_M$, will now be related to the speed components. It is clear from FIG. 2c that $$\tan \theta_{REL} = R_M/(R_0^2 - R_M^2) = K, \quad (3)$$

and from equation 2

$$K = \dot{W}_S - \dot{W}_T/\dot{U}_S - \dot{U}_T \quad (4)$$

$\dot{U}_S$ and $\dot{W}_S$ are the direction components of own ship that will yield the desired miss distance $R_M$. With the quantities $\dot{U}_T$ and $\dot{W}_T$ obtained from the system radar data, $\dot{U}_S$ and $\dot{W}_S$ may be obtained for equations 3 and 4. Accordingly, equation 4 is rearranged to obtain $$\dot{W}_S = \dot{W}_T + K(\dot{U}_S - \dot{U}_T) \quad (5)$$

However, $$\dot{W}_S^2 = V_S^2 - \dot{U}_S^2 \quad (6)$$

Combining equations 5 and 6 yields:

$$(K\dot{U}_S - K\dot{U}_T + \dot{W}_T)^2 = V_S^2 - \dot{U}_S^2$$

or:

$$K^2 \dot{U}_S^2 + 2K(\dot{W}_T - K\dot{U}_T)\dot{U}_S + (\dot{W}_T - K\dot{U}_T)^2 = V_S^2 - \dot{U}_S^2$$

or:

$$\dot{U}_S = \frac{-K(\dot{W}_T - K\dot{U}_T) \pm [(K^2+1)V_S^2 - (\dot{W}_T - K\dot{U}_T)^2]^{1/2}}{(K^2+1)}$$

(7)

Hence, equations 5 and 7 define the direction own ship must assume to obtain the desired miss distance of $R_M$.

The danger areas are defined by the distances measured from the target to the end points of the danger zone $D_1$, $D_2$, $D_3$ and $D_4$ as described above with respect to FIG. 2a. To define these distances, reference may be had to FIG. 2d.

Figure 2D:
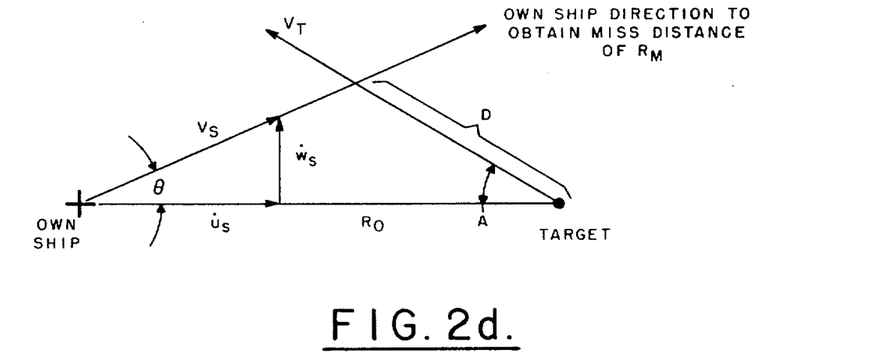

By the law of sines, $$R_0/\sin(\theta + A) = D/\sin\theta$$

Or:

$$D = V_S R_0 \sin\theta / V_S \sin\theta \cos A + V_S \sin A \cos\theta$$

Or: $D = R_0 \dot{W}_S/\dot{W}_S \cos A + \dot{U}_S \sin A$  (8)

From the geometry of FIGS. 2b and c, $$\sin A = X_T \dot{Y}_T - Y_T \dot{X}_T / R_0 V_T$$

And $$\cos A = -X_T \dot{X}_T + Y_T \dot{Y}_T / R_0 V_T$$

where $X_T$, $\dot{X}_T$, $Y_T$ and $\dot{Y}_T$ are as defined above and hence $$\dot{W}_T = X_T \dot{Y}_T - Y_T \dot{X}_T / R_0 \quad (9)$$

$$\dot{U}_T = \dot{X}_T X_T = \dot{Y}_T Y_T / R_0 \quad (10)$$

Equation 8 may thus be written as $$D = R_0 V_T \dot{W}_S / \dot{U}_S \dot{W}_T - \dot{W}_S \dot{U}_T \quad (11)$$

Equations 3, 5, 7, 9, 10 and 11 will yield the D's necessary to define the regions of danger.

The quantities $R_0$, $V_T$, $X_T$, $Y_T$, $\dot{X}_T$ and $\dot{Y}_T$ are obtained from the radar data while the desired minimum miss distance, $R_M$, is set into the system by the ship's officer. The quantity own ship's speed, $V_S$, is obtained from the ship's speed log.

Equations 9 and 10 provide the values $\dot{W}_T$ and $\dot{U}_T$ by substituting $X_T$, $Y_T$, $\dot{X}_T$, $\dot{Y}_T$ and $R_0$ therein and equation 3 provides the values of K by substituting $R_0$ and $R_M$ therein. Equation 7 provides the values of $\dot{U}_S$ by substituting $\dot{U}_T$, $\dot{W}_T$, K and $V_S$ therein while equation 5 yields the corresponding values of $\dot{W}_S$ by substituting $\dot{U}_T$, $\dot{W}_T$, K and $\dot{U}_S$ therein. Equation 11 then yields the required values of D by substituting $R_0$, $V_T$, $\dot{U}_S$, $\dot{W}_S$, $\dot{U}_T$ and $\dot{W}_T$ therein.

It will be noted that there are two square roots involved in these equations. The two square roots yield four solutions, which in general are required for a target faster than own ship. Extraneous solutions can be avoided by examining the individual situations as follows.

As previously explained, the regions of danger are defined by four positions along the target's course $D_1$, $D_2$, $D_3$ and $D_4$. $D_1$ is the closest to the target, $D_2$ is the next closest, $D_3$ the next closest after $D_2$, and $D_4$ the furthest. Either $D_1$ or $D_2$ exist, $D_1$ through $D_4$ exist, or none exist. No other combinations are possible.

Because of the two square roots in equations 3 and 7, a closed form solution to obtain one equation would result in a fourth order equation. Whether it is decided to solve this fourth order equation or the set of simultaneous equations presented above, it is necessary to remove extraneous solutions such as negative time solutions and imaginary solutions which are possible.

The following is a method of determining which solutions are valid solutions. When $R_0$ is greater than $R_M$ there are two values of K from equation 3. The case of $R_0$ equal to or less than $R_M$ will be discussed later. The value of the quantity under the radical of equation 7 is examined for sign for each of the values of K found from equation 3. If the quantity under the radical is found to be negative, the corresponding $\dot{U}_S$ from equation 7 is deemed invalid. For each value of $\dot{U}_S$ determined to be invalid, the resulting D calculated from this invalid $\dot{U}_S$ will be an extraneous solution. If all D's are eliminated, it means that no collision danger area exists for this intruder. After the test is made on the radical of equation 7, there still may be four possible solutions for D which may or may not be valid. To eliminate the remaining extraneous solutions, a test is made as on $\dot{U}_S - \dot{U}_T$. If $\dot{U}_S - \dot{U}_T$ is greater than zero, the resulting D is a valid solution. If $\dot{U}_S - \dot{U}_T$ is equal to or less than zero, the associated D is an extraneous solution.

After establishing which of the values of D are valid solutions, the valid D's are arranged in increasing numerical order. The smallest solution, i.e., the least positive or the most negative of the D's, is defined as $D_1$. $D_2$, $D_3$ and $D_4$ are defined to be the next three sequentially larger solutions following $D_1$, respectively.

Generally, for targets slower than own ship, $D_1$ and $D_2$ will exist hence resulting in one region of danger. If own ship heads for $D_2$ it will pass safely in front of the target vessel by the predetermined miss distance. Similarly, if own ship heads for $D_1$ it will pass safely therebehind. In a similar manner for targets faster than own ship, generally all four D's will exist and be valid. Under this condition, two regions of danger will generally exist, $D_1$ and $D_2$ defining the first region with $D_3$ and $D_4$ defining the second region. If own ship heads for $D_4$ or $D_1$, it will pass safely behind the target by the predetermined miss distance and if own ship heads for $D_2$ or $D_3$, it will pass safely in front of the intruder. The above calculations which yield the values of D assure that own ship will not pass closer to the target than the desired miss distance at any point in time if own ship heads for one of the D's or in general avoids the danger area defined by the D's.

With the D's defined and evaluated as explained above, elliptical regions of danger are displayed by conventional techniques to be later discussed. $D_1$ and $D_2$ define the end points of the major axis of one of the ellipses, while $D_3$ and $D_4$ define the major axis of the other ellipse that may be associated with a target. The minor axes of both ellipses are set at $2R_M$ for the reasons previously discussed. The major axes of the ellipses are aligned with the target track which track is computed to end at the center of the ellipse for convenience and clarity of display.

It is appreciated that when own ship avoids these elliptical regions of danger, at least a predetermined minimum passing distance is achieved with respect to all of the collision threats in the vicinity of own ship.

Although the present invention has been described in terms of elliptical regions of danger, it is appreciated that many other elongated geometrical curves may be utilized to the same effect, the ends of the longitudinal axes of the curves being defined by the D's in a manner similar to that described above and the lateral axes thereof being set at $2R_M$ for the reasons hereinabove explained. Alternatively, a contrasting colored line segment displayed between the D's may be utilized in defining the regions of danger.

It should be noted that for certain dynamic situations of target vessels with respect to own ship, anomolous mathematical situations may occur in the above given equations. For example, when the velocity of the target is nearly zero, the numerator and denominator of equation 11 both approach zero and hence the computation for the D's becomes mathematically indeterminate. Also, when the target ship is closer to own ship than the desired miss distance, $R_M$, the denominator of equation 3 becomes imaginary. Additionally, when the target is substantially on a direct line to own ship's position, i.e., when the target velocity vector is aligned along the line of sight between own ship and the target, the above given mathematical philosophy with respect to defining the D's at the points where own ship may cross the target vector is then not applicable. For this situation the above given equations would yield a D value at own ship's position. Under these various anamolous situations it has been found that a predicted point of collision computation of the type described in said Ser. No. 87,025 is adequate to define the regions of danger.

In implementing the solution of the above equations from the geometry of FIGS. 2a through 2d, it will be understood that a variety of types of known sensor, computer and symbol generator devices may be successfully employed. It is evident by inspection of the foregoing analysis that solution of the equations thereby generated may be accomplished by several known methods, including the use of a cooperative assembly of known analog or known digital data processing or computing circuits. For example, the several equations involve simple arithmetic operations such as addition, subtraction, multiplication, squaring, and extraction of square roots. Many examples of both analog and digital computer elements are available in the prior art for accomplishing such computations and it is well known that they may readily be coupled together in cooperative relation for attaining desired results. It is furthermore evident that a conventional general purpose digital or analog computer may be employed for the purpose. It is obviously well within the ordinary skill of digital computer programmers to process the equations and decision logic discussed above, to create flow charts, and to translate the latter into computer routines and sub-routines for solution of such equations along with a compatible computer language for processing input data and instructions to produce outputs directly useful for application in a standard cathode ray tube display.

Figure 3:
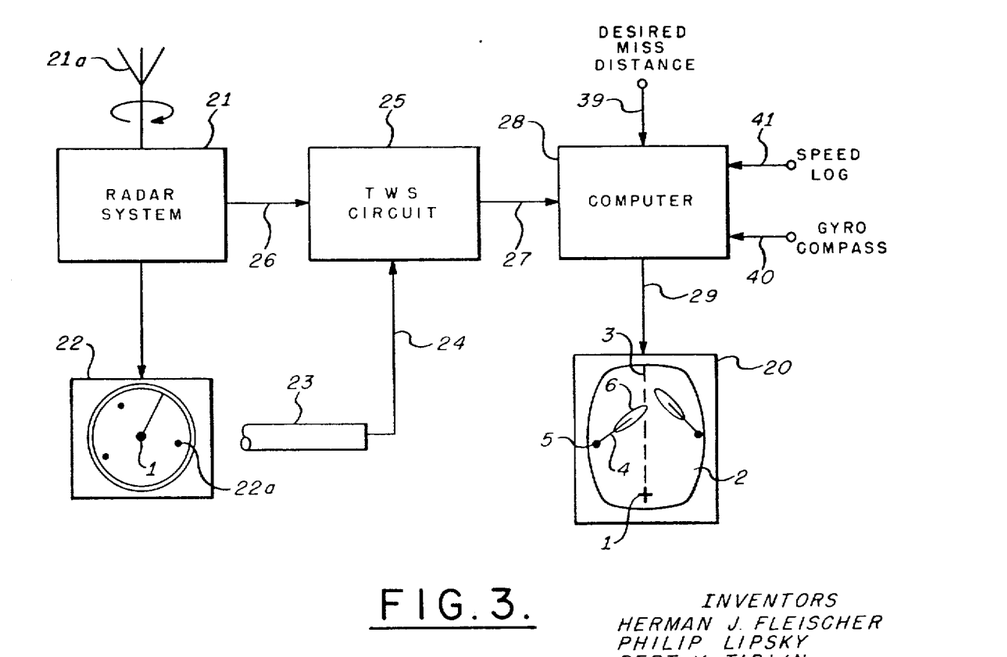
FIG. 3 is a block diagram illustrating one embodiment of the invention.

FIG. 3 represents one possible instrumentation for practicing the invention and incorporating the novel maneuver assessment display 20. As previously indicated, the system uses data derived, for example, by a conventional azimuth scanning pulse radar system 21 of the type widely used in marine radar applications and employing a directive azimuth-scanning antenna. In the invention, the radar antenna azimuth or bearing data and detected target range data may be used to generate, in a conventional way, a type P or plan position presentation on the screen of display 22. Thus, when the display is a centered type P display, all targets in the vicinity of radar 21 are periodically intensified on the screen of display 22. Target 22a represents one such target, while the location of own ship is represented at 1. Additional targets will generally appear on display 22, along with reflections from fixed obstacles including land masses, if present. Variants of the regular type P display may be used, such as an offset type P display and others. Further, certain characteristics of images such as that of target 22a may be modified to enhance rapid recognition of those representing dangerous targets, as is customarily done in collision warning displays. However, the simple type P display is by inherent nature a collision warning display and so it is placed in FIG. 3 as representative of prior art collision warning or collision assessment displays in general.

As noted, several targets will often appear on display 22, each having a greater or lesser hazard characteristic with respect to own ship 1. The operator of own ship 1 selects intruding targets for investigation, entering them into the collision avoidance system yet to be described. Alternatively, all of the targets appearing on the display 22 may be entered providing that the system has adequate capacity.

Entry of the coordinates of the selected target is accomplished by placing a conventional light-sensitive pick up 23 or "light-pen" or other transducer over the location of the selected target image. Such a pick up device is illustrated in use in the Frank U.S. Pat. No. 3,182,320 issued May 4, 1965, and covering an "Automatic Range and Azimuth Track While Scan System." At the time that the target image is next intensified, an electrical pulse is transmitted via lead 24 to track-while-scan system 25, which system also receives synchronizing and other signals via leads 26 from radar unit 21.

Track-while-scan system 25, like radar unit 21, is not necessarily a novel part of the system, as suitable devices for practicing its function are present in the prior art. Track-while-scan systems are of the general class of devices known as devices for tracking grouped or periodically interrupted data and their theoretical basis is explained by W. B. Jones and R. I. Hulsizer in Section 9.8 (page 378 et seq.) of Volume 20 of the Radiation Laboratory Series: "Electronic Time Measurements." Practical forms of these devices, which may be analog or digital in instrumentation, are described in several U.S. Patents, such as for example in the White U.S. Pat. No. 2,849,707 for a "Position Correcting Means for Track-While Scan Channels", issued Aug. 26, 1958, in the Coveley U.S. Pat. No. 2,944,253 for a "Radar System and Display", issued July 5, 1960, in the Close U.S. Pat. No. 3,064,250 for an "Automatic Track-While-Scan-Channel," issued Nov. 13, 1962, and elsewhere.

According to prior practice, such devices as optical pick up 23 have been used to enter coordinate data characterizing a selected target appearing on a type P or other cathode ray indicator 22 into storage in a track-while-scan device, such as apparatus 25, where its rectangular or polar coordinates may be stored. Automatic lock-on in the conventional manner by apparatus 25 to signals received directly via conductor 26 from the receiver of radar 21 at the time the antenna 21a next sweeps past the selected target automatically corrects the stored positional data of the selected target after its initial entry until the operation is manually disabled. Thus, for example, coordinates X and Y and rates $\dot{X}$ and $\dot{Y}$ may be stored for any such target. Entry of a new or next apparently dangerous target generates a second set of X, Y, $\dot{X}$ and $\dot{Y}$ data for storage within track-while-scan apparatus 25 for the newly selected target. Such stored X, $\dot{Y}$, $\dot{X}$ and Y data may be stored at the will of the operator in this manner for a plurality of intruding vessels for supply, upon demand, as on a time shared basis, via conductors 27 to computer 28. As previously noted, track-while-scan apparatus 25 may be either of analog or digital nature and may be supplied, if required, in a conventional manner by suitable analog-to-digital or digital-to-analog converters as interface elements between various components of the system such as apparatus 25 and computer 28. It will be understood that track-while-scan apparatus 25 is actually a type of computer device in itself, performing arithmetic functions such as differentiation, and storing data. It will therefore be understood that its function may be performed either in a discrete unit, such as in the separate apparatus 25, or that its arithmetic and storage operations may be performed by respective arithmetic and storage elements present in computer 28. The latter elements may perform other system functions in a conventional manner on a time sharing basis. The computer may, for example, comprise a commercially procurable UNIVAC 418 digital computer or the like.

Referring again to FIG. 1, it will be seen that computer 28 has several computations to perform in generating the maneuver assessment symbols on the indicator 20 of FIG. 3 and that the stored X and Y coordinates of the various targets are readily available in the track-while-scan unit 25. Since the motions of each of the ships in the vicinity of own ship are relatively slow compared to the speeds of even the simplest computers, it is seen that it is not necessary to compute all of the data in real time and, consequently, the threat or hazard data is conveniently stored and up-dated only periodically by track-while-scan system 25. Thus, there will be little difference between the actual X and Y coordinates of a particular target and the corresponding stored X and Y coordinates derived by computer 28 from track-while-scan system 25. It will also be understood that a plurality of symbols such as that made up of elements 4, 5 and 6 of FIG. 1 may readily be generated on a time sharing or multiplexing basis using simple time sharing techniques well known in the analog and digital computer arts.

Referring now particularly to the computer 28 and display 20 for generating a composite symbol made up of elements 4, 5 and 6, it is apparent that the X and Y coordinates of the point 5 in FIG. 1 substantially represent the present rectangular coordinates of a target or hazard vessel. In the following, it will be understood that the discussion of the location 5 and of the coordinate characteristics of other elements of the symbol could equally well be discussed in the same manner if polar $p$, $\theta$ coordinates were in actual use in the system under discussion.

It is apparent that computer 28 may be programmed so as periodically to derive, from track-while-scan system 25, the X and Y coordinates of location 5 shown in FIG. 1 and to supply by well known means coordinate values as control signals to display 20 via leads 29 and thus to cause the cathode ray beam to be instantaneously intensified so as to form a bright spot at point 5 on display 20.

It is necessary to use own ship's speed, applied from own ship's speed log, on lead 41, and own ship's heading, applied from the ship's gyrocompass to lead 40, to obtain the north and east velocities of the intruders relative to the earth. This may conveniently be accomplished in the computer 28 by resolving the intruder's relative north and east velocities using own ship's heading and then subtracting own ship's east and north velocities to obtain intruder's north and east velocities relative to the earth. Own ship's speed is available on lead 41 and own ship's heading on lead 40. An alternate method is to transmit own ship's speed and heading to the track-while-scan circuit 25 on a lead not shown and do the north and east resolutions and subtractions therein.

As previously described, the computer 28 is responsive to the target position and velocity data provided by the track-while-scan circuit 25 on the lead 27. In addition, the computer 28 is responsive to a signal on lead 39 that is representative of the desired predetermined miss distance $R_M$. This quantity is set into the computer by the ship's officer. The computer 28 is also responsive to own ship's speed from the speed log applied to lead 41 and to own ship's heading as derived from the ship's gyrocompass and applied to the lead 40. Responsive to the inputs on the leads 27, 39, 40 and 41 and in a manner similar to that described above, the computer 28 is programmed to provide the coordinates of the end points of the major and minor axes of the ellipse 6 as well as the center point thereof. Conventional methods similar to those taught in U.S. Pat. No. 3,476,974, entitled "Digital Controlled Elliptical Display", by R. E. Turnage Jr., et al., and issued Nov. 4, 1969, may be utilized to generate the coordinate signals required for the ellipse generation. These signals provided by the computer 28 to the display 20 via leads 29, cause the cathode ray beam to be intensified thereby forming the ellipse 6 on the display 20 in a symbol generation procedure similar to that described in said Ser. No. 87,025. With the coordinates of the point 5 and the coordinates of the center of the ellipse 6 computed, the line 4 may be drawn therebetween as previously discussed in a manner similar to that explained in said Ser. No. 87,025 and in such U.S. Pats. as No. 2,406,858 entitled "Visual Position and Phase Sense Indicator " by J. E. Shepherd, et al., issued Sept. 3, 1946, U.S. Pat. No. 3,325,802 entitled "Complex Pattern Generation Apparatus" by J. R. Bacon, issued June 13, 1967, U.S. Pat. No. 3,394,367 entitled "Symbol Generator" by Dye, issued July 23, 1968 and U.S. Pat. No. 3,289,195 entitled "Delay Line Wave Shape Generator" by Townsend, issued Nov. 29, 1966.

The symbols such as own ship's index 1 and own course marker 3 may be generated by techniques well known in the art in a manner similar to that taught in said Ser. No. 87,025 or in such U.S. Pats. as No. 3,164,822 entitled "Diode Wave Form Generator for Symbol Generation During the Retrace Interval of a Cathode Ray Tube" by F. B. Uphoff issued Jan. 5, 1965; U.S. Pat. No. 3,164,823, entitled "Symbol Generating System for CRT Displays Employing Retrace Insertion" by F. B. Uphoff, issued Jan. 5, 1965 and U.S. Pat. No. 3,283,317 entitled "Symbol Generators" by H. M. Courter, issued Nov. 1, 1966.

It is appreciated that a variety of computer controlled cathode ray tube displays are known in the art that may be adapted for use in practicing the invention. One such display is discussed in U.S. Pat. No. 3,519,997 entitled "Planar Illustration Method and Apparatus" by W. D. Bernhart, et al., issued July 7, 1970, particularly with regard to column 4, lines 57–60. Alternatively, an arrangement similar to the conventional computer controlled cathode ray tube data terminal display may be adapted to practice the invention. In such an arrangement, the central computer provides data to the terminal computer which in turn provides the signals for generating symbols on the associated cathode ray tube display. Alternatively, the arrangement described in said Ser. No. 87,025 may be adapted in accordance with the teachings of the present invention to instrument the present collision avoidance system.

It will now be appreciated that the above-described display format, as illustrated in FIG. 1, provides readily interpretable indicia for the assessments of maneuvers to avoid collision. In an environment crowded with moving vessels, such as in a harbor, the predicted target tracks with the associated elliptical regions of danger centered at the ends thereof and with the major axes of the ellipses aligned therewith provides a particularly readable display with the numerous ellipses clearly associated with their respective targets.

Although the above-described embodiment of the invention has been explained in terms of the equations disclosed, it will be appreciated that other sets of equations within the scope of the invention may be utilized in embodying the inventive concepts hereinabove set forth.

It is further appreciated from the foregoing descriptions that the computations are performed so that the display illustrated in FIG. 1 is independent of own ship's heading. Accordingly, when own ship changes bearings without changing speed, the course line 3 correspondingly rotates but the indicia associated with the targets do not so rotate. This procedure, as well as providing a readily interpretable display, facilitates tracking and smoothing of target data. Following a maneuver of own ship, the display may be reset by means not shown so that own ship's course line 3 is again upwardly oriented.

It is apparent that the line trace 4 and the elliptical symbol 6 may be drawn simultaneously or nearly so, as desired. A dual gun cathode ray tube employing corresponding sets of electrostatic deflection electrodes for each electron beam permits drawing the line with one gun-beam deflection system and the ellipse with the second gun-beam deflection system. Single gun operation with a single deflection system may be used, for example, with the ellipse being traced instantaneously prior to the tracing of the line.

The display 20 may employ an ordinary type of cathode ray tube in which the decay period of the phosphor on the display screen is selected so that a symbol traced in the past has substantially faded by the time that computer 28 calls for upgrading of the display. Regular or random erasure of the display may also be accomplished under control of computer 28 when a conventional direct viewing storage type of cathode ray display is employed. Such erasure may also be accomplished as in the past at any time desired by the observer.

Variations of the system illustrated in FIG. 3 are readily apparent that may lend even greater versatility to the maneuver assessment display system. It is seen that the optical pick off 23, or a similar device, may be used to pick off coordinate data from the display of a long range or early warning radar system or from a sonar display or other proximity warning display or device. By means of the track-while-scan system 25, the operator may cause the system to lock on to and to track any selected hazard detected by any available sensor. The relative bearings and ranges of the targets locked into the automatic tracking operation are readily available in upgraded form for manipulation by computer 28 for generating data required of symbol generators 31 and 35 for producing display 20.

The data, while present in the computer 28, may be manipulated or refined by the use of inertial stabilizing information such as provided by the ship's stable element or roll and pitch information from a more elaborate gyrocompass. In this manner, the threat bearings may be corrected for own ship's roll, pitch, or yaw motions in a conventional manner as a refinement of the invention. Alternatively, the data generated by the radar system may be provided with inherent stabilization features by the direct servo stabilization of antenna scanner 21a. Functions not directly related to the collision avoidance and maneuver assessment functions may also be performed by computer 28 on a time sharing basis, such as inertial navigational functions and the like.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. In apparatus for assessing maneuvers of a craft to avoid collision with navigable vehicles including sensing means for providing signals representative of the positions and velocities of said craft and vehicles, comprising computing means responsive to said signals for computing regions associated with said vehicles respectively, which regions if avoided by said craft assure that said craft will not pass closer to said vehicles than a predetermined distance for all relative positions and velocities thereof, and display means coupled to said computing means for displaying said regions thereby providing indicia to assess maneuvers of said craft to avoid collision with said vehicles.

2. In the apparatus of claim 1 in which said computing means includes means for computing predicted tracks for said vehicles to said regions respectively, and said display means includes means for displaying said predicted tracks thereby providing indicia to assess maneuvers of said craft to avoid collision with said vehicles.

3. In the apparatus of claim 2 in which said computing means includes means for computing points on said tracks representative of bearings which if taken by said craft would result in said craft passing and vehicles at said predetermined distance at the closest points of approach therebetween respectively and means for computing elongated geometrical curves passing through said points and having longitudinal axes, the ends of which are coincident with said points thereby computing said regions respectively, and said display means includes means for displaying said curves.

4. In the apparatus of claim 3 in which said computing means includes means for computing said elongated curves having lateral axes equal to twice said predetermined distance.

5. In the apparatus of claim 4 in which said elongated curves comprise ellipses having major axes equal to said longitudinal axes and minor axes equal to said lateral axes, respectively.

6. In the apparatus of claim 5 in which said sensing means provides signals representative of the positions and velocities of said craft and a navigable vehicle characterized by parameters $X_T$, $Y_T$ representing position coordinates of said vehicle, $\dot{X}_T$, $\dot{Y}_T$ representing velocity components of said vehicle, $R_O$ representing the distance between said craft and said vehicle at an initial time, $V_T$ representing speed of said vehicle, $V_S$ representing speed of said craft and $R_M$ representing said predetermined distance;

said computing means includes means responsive to the application of measured values of said parameters for solving for values of a parameter D representing said points on said predetermined track using the equation $$D = R_O\, V_T\, \dot{W}_S/\dot{U}_S\, \dot{W}_T - \dot{W}_S\, \dot{U}_T \text{ where,}$$

$$\dot{W}_T = X_T\, \dot{Y}_T - Y_T\, \dot{X}_T/R_O \text{ and,}$$

$$\dot{U}_T = X_T\, \dot{X}_T + Y_T\, \dot{Y}_T/R_O \text{ and,}$$

$$\dot{U}_S = \frac{-K(\dot{W}_T - K\dot{U}_T) \pm [(K^2+1)V_S^2 - (\dot{W}_T - K\dot{U}_T)^2]^{1/2}}{(K^2+1)}$$

$$\dot{W}_S = \dot{W}_T + K(\dot{U}_S - \dot{U}_T), \text{ where}$$

$$K = R_M/(R_O^2 - R_M^2) \text{ ; and}$$

Said display means includes means for displaying said ellipses in accordance with said values of D.

7. In the apparatus of claim 6 in which said computing means further includes means for computing coordinate data for said ellipses in accordance with said values of D, and said display means includes means responsive to said coordinate data for displaying said ellipses.

8. In the apparatus of claim 6 in which said computing means comprises digital computing means programmed to solve said equation.

9. In the apparatus of claim 2 in which said computing means includes means for computing a predicted track for said craft, and said display means includes means for displaying said predicted track thereby providing indicia to assess maneuvers of said craft to avoid collision with said vehicles.

10. Apparatus for assessing maneuvers of a craft to avoid collision with navigable vehicles comprising sensing means for providing signals representative of the positions and velocities of said craft and vehicles, computing means responsive to said signals for computing regions associated with said vehicles respectively, which regions if avoided by said craft assure that said craft will not pass closer to said vehicles than a predetermined distance for all relative positions and velocities thereof, and display means coupled to said computing means for displaying said regions thereby providing indicia to assess maneuvers of said craft to avoid collision with said vehicles.

11. The apparatus of claim 10 in which said sensor means comprises azimuth scanning radar means for detecting said position data of said vehicles with respect to said craft, intermediate display means for displaying images representing said vehicles, transducer means for generating electrical impulses upon intensification of said images respectively on said intermediate display, and means responsive to said impulses for automatically tracking and storing said position and velocity data characterizing said vehicles.

* * * * *

UNITED STATES PATENT OFFICE
CERTIFICATE OF CORRECTION

Patent No. 3,725,918          Dated April 3, 1973

Inventor(s) Herman J. Fleischer, Philip Lipsky and Bert V. Tiblin

It is certified that error appears in the above-identified patent and that said Letters Patent are hereby corrected as shown below:

Column 4, equation (3), the portion reading "$-R_M^2) = K$", should read $-R_M^2)^{\frac{1}{2}} = K$; equation (4) should read $K=(\hat{W}_S-\hat{W}_T)/(\hat{U}_S-\hat{U}_T)$. Column 5, line 13, the equation should read: $D=(V_S R_O \sin\theta)/(V_S \sin\theta \cos A + V_S \sin A \cos\theta)$; equation (8), line 15, should read $D=(R_O \hat{W}_S)/(\hat{W}_S \cos A + \hat{U}_S \sin A)$; the equation on line 18 should read $\sin A = (X_T \hat{Y}_T - Y_T \hat{X}_T)/(R_O V_T)$; the equation on line 21 should read: $\cos A = -(X_T \hat{X}_T + Y_T \hat{Y}_T)/(R_O V_T)$; equation (9) should read $\hat{W}_T=(X_T \hat{Y}_T - Y_T \hat{X}_T)/R_O$; equation (10) should read: $\hat{U}_T=(\hat{X}_T X_T + \hat{Y}_T Y_T)/R_O$; equation (11) should read $D=(R_O V_T \hat{W}_S)/(\hat{U}_S \hat{W}_T - \hat{W}_S \hat{U}_T)$.

Column 13, line 4, change "and" to --said--; equations appearing between lines 40 and 45 should read: $D=(R_O V_T \hat{W}_S)/(\hat{U}_S \hat{W}_T - \hat{W}_S \hat{U}_T)$ where, $\hat{W}_T=(X_T \hat{Y}_T - Y_T \hat{X}_T)/R_O$ and, $\hat{U}_T=(X_T \hat{X}_T + Y_T \hat{Y}_T)/R_O$ and; last line in column 13, last portion of equation which reads "$(K^2+1$" should read $(K^2+1)$.

Column 14, second line equation, the portion which reads "$-R_M^2);$" should read $-R_M^2)^{\frac{1}{2}};$ .

Signed and sealed this 3rd day of December 1974.

(SEAL)
Attest:

McCOY M. GIBSON JR.
Attesting Officer

C. MARSHALL DANN
Commissioner of Patents